US006457143B1

(12) United States Patent
Yue

(10) Patent No.: US 6,457,143 B1
(45) Date of Patent: Sep. 24, 2002

(54) SYSTEM AND METHOD FOR AUTOMATIC IDENTIFICATION OF BOTTLENECKS IN A NETWORK

(75) Inventor: Po Cheung Yue, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/410,244

(22) Filed: Sep. 30, 1999

(51) Int. Cl.[7] .............................................. G06F 11/00
(52) U.S. Cl. ........................................ 714/43; 709/223
(58) Field of Search ............................. 714/43, 44, 45, 714/47, 48, 37, 38, 39; 710/15, 17; 709/223, 224

(56) References Cited

U.S. PATENT DOCUMENTS

| | | | | |
|---|---|---|---|---|
| 5,097,469 A | * | 3/1992 | Douglas | 371/20.1 |
| 5,446,680 A | * | 8/1995 | Sekiya et al. | 364/550 |
| 5,563,875 A | * | 10/1996 | Hefel et al. | 370/15 |
| 5,644,717 A | * | 7/1997 | Clark | 395/200.11 |
| 5,884,075 A | * | 3/1999 | Hester et al. | 395/653 |
| 6,041,041 A | * | 3/2000 | Ramanathan et al. | 370/241 |
| 6,067,545 A | * | 5/2000 | Wolff | 707/10 |
| 6,069,872 A | * | 5/2000 | Bonomi et al. | 370/236 |
| 6,125,408 A | * | 9/2000 | McGee et al. | 710/8 |

* cited by examiner

Primary Examiner—Nadeem Iqbal
(74) Attorney, Agent, or Firm—F. Chau & Associates, LLP

(57) ABSTRACT

A system and method for providing automated bottleneck identification in networks and networked application environments by processing using end-to-end quality of service measurements in combination with knowledge of internal resource dependency information generated by a network administrator. In one aspect, a method for identifying bottleneck resources in a network having a plurality of resources comprises the steps of: specifying a plurality of probe transactions in the network; generating resource dependency information representing dependent resources for each of the probe transactions; executing the probe transactions; measuring end-to-end quality of service data resulting from the executing of the probe transactions; and processing the resource dependency information and measured end-to-end quality of service data to identify bottleneck resources in the network. The system and method eliminate the need for obtaining and processing detailed measurements and/or estimates of parameters or data at the per resource level to identify bottlenecks.

32 Claims, 7 Drawing Sheets

|              | mail probes         | db probes           | echo probes         |
|--------------|---------------------|---------------------|---------------------|
| SubNet 1     | 1 1 1 1 1 0 0 0 0 0 | 1 1 1 1 1 0 0 0 0 0 | 1 1 1 1 1 0 0 0 0 0 |
| SubNet 2     | 0 0 0 0 0 1 1 1 1 1 | 0 0 0 0 0 1 1 1 1 1 | 0 0 0 0 0 1 1 1 1 1 |
| Router R1    | 1 1 1 1 1 0 0 0 0 0 | 1 1 1 1 1 0 0 0 0 0 | 1 1 1 1 1 0 0 0 0 0 |
| Router R2    | 0 0 0 0 0 1 1 1 1 1 | 1 1 1 1 1 0 0 0 0 0 | 1 1 1 1 1 0 0 0 0 0 |
| WAN          | 1 1 1 1 1 1 1 1 1 1 | 1 1 1 1 1 1 1 1 1 1 | 1 1 1 1 1 1 1 1 1 1 |
| Gateway G1   | 1 0 0 0 1 1 0 0 0 1 | 1 0 0 0 1 1 0 0 0 1 | 1 0 0 0 1 1 0 0 0 1 |
| Gateway G2   | 0 1 1 1 0 0 1 1 1 0 | 0 1 1 1 0 0 1 1 1 0 | 0 1 1 1 0 0 1 1 1 0 |
| Server S1    | 1 0 0 0 1 1 0 0 0 1 | 1 0 0 0 1 0 0 0 0 1 | 1 0 0 0 1 1 0 0 0 0 |
| Server S2    | 1 1 0 0 0 1 1 0 0 0 | 0 1 0 0 0 1 0 0 0 0 | 0 1 0 0 0 0 1 0 0 0 |
| Server S3    | 0 1 1 0 0 0 1 1 0 0 | 0 0 1 0 0 0 1 0 0 0 | 0 0 1 0 0 0 0 1 0 0 |
| Server S4    | 0 0 1 1 0 0 0 1 1 0 | 0 0 0 1 0 0 0 1 0 0 | 0 0 0 1 0 0 0 0 1 0 |
| Server S5    | 0 0 0 1 0 0 0 0 1 0 | 0 0 0 0 0 0 0 0 0 0 | 0 0 0 0 0 0 0 0 0 0 |
| Server S6    | 0 0 0 0 1 0 0 0 0 1 | 0 0 0 0 1 0 0 0 0 1 | 0 0 0 0 1 0 0 0 0 1 |
| sendMail@S1  | 1 0 0 0 0 1 0 0 0 0 | 0 0 0 0 0 0 0 0 0 0 | 0 0 0 0 0 0 0 0 0 0 |
| sendMail@S2  | 0 1 0 0 0 0 1 0 0 0 | 0 0 0 0 0 0 0 0 0 0 | 0 0 0 0 0 0 0 0 0 0 |
| sendMail@S3  | 0 0 1 0 0 0 0 1 0 0 | 0 0 0 0 0 0 0 0 0 0 | 0 0 0 0 0 0 0 0 0 0 |
| sendMail@S4  | 0 0 0 1 0 0 0 0 1 0 | 0 0 0 0 0 0 0 0 0 0 | 0 0 0 0 0 0 0 0 0 0 |
| sendMail@S5  | 0 0 0 0 0 0 0 0 0 0 | 0 0 0 0 0 0 0 0 0 0 | 0 0 0 0 0 0 0 0 0 0 |
| sendMail@S6  | 0 0 0 0 1 0 0 0 0 1 | 0 0 0 0 0 0 0 0 0 0 | 0 0 0 0 0 0 0 0 0 0 |
| recvMail@S1  | 0 0 0 0 1 0 0 0 0 1 | 0 0 0 0 0 0 0 0 0 0 | 0 0 0 0 0 0 0 0 0 0 |
| recvMail@S2  | 1 0 0 0 0 1 0 0 0 0 | 0 0 0 0 0 0 0 0 0 0 | 0 0 0 0 0 0 0 0 0 0 |
| recvMail@S3  | 0 1 0 0 0 0 1 0 0 0 | 0 0 0 0 0 0 0 0 0 0 | 0 0 0 0 0 0 0 0 0 0 |
| recvMail@S4  | 0 0 1 0 0 0 0 1 0 0 | 0 0 0 0 0 0 0 0 0 0 | 0 0 0 0 0 0 0 0 0 0 |
| recvMail@S5  | 0 0 0 1 0 0 0 0 1 0 | 0 0 0 0 0 0 0 0 0 0 | 0 0 0 0 0 0 0 0 0 0 |
| recvMail@S6  | 0 0 0 0 0 0 0 0 0 0 | 0 0 0 0 0 0 0 0 0 0 | 0 0 0 0 0 0 0 0 0 0 |
| dbAccess@S1  | 0 0 0 0 0 0 0 0 0 0 | 1 0 0 0 0 1 0 0 0 0 | 0 0 0 0 0 0 0 0 0 0 |
| dbAccess@S2  | 0 0 0 0 0 0 0 0 0 0 | 0 1 0 0 0 0 1 0 0 0 | 0 0 0 0 0 0 0 0 0 0 |
| dbAccess@S3  | 0 0 0 0 0 0 0 0 0 0 | 0 0 1 0 0 0 0 1 0 0 | 0 0 0 0 0 0 0 0 0 0 |
| dbAccess@S4  | 0 0 0 0 0 0 0 0 0 0 | 0 0 0 1 0 0 0 0 1 0 | 0 0 0 0 0 0 0 0 0 0 |
| dbAccess@S5  | 0 0 0 0 0 0 0 0 0 0 | 0 0 0 0 0 0 0 0 0 0 | 0 0 0 0 0 0 0 0 0 0 |
| dbAccess@S6  | 0 0 0 0 0 0 0 0 0 0 | 0 0 0 0 1 0 0 0 0 1 | 0 0 0 0 0 0 0 0 0 0 |

FIG. 4

Sample Snapshot of Bottleneck Resources

| User Subnets | Path Resources | Servers | Transactions | Transactions (cont.) |
|---|---|---|---|---|
| Subnet 2<br>12:3 score=0.2 | Router 2<br>22:6 score=0.214 | $S_1$<br>5:0 score=0.0 | dbTest@S1<br>2:0 score=0.0 | recvMail@S1<br>2:0 score=0.0 |
| Subnet 1<br>10:3 score=0.230 | Gateway G1<br>8:3 score=0.272 | $S_2$<br>5:0 score=0.0 | dbTest@S2<br>2:0 score=0.0 | recvMail@S2<br>1:0 score=0.0 |
| | Gateway G2<br>14:3 score=0.176 | $S_3$<br>4:2 score=0.333 | dbTest@S3<br>2:0 score=0.0 | recvMail@S3<br>2:0 score=0.0 |
| | | $S_4$<br>3:2 score=0.4 | dbTest@S4<br>2:0 score=0.0 | recvMail@S4<br>0:2 score=1.0 |
| | | $S_5$<br>1:0 score=0.0 | dbTest@S6<br>2:0 score=0.0 | recvMail@S5<br>1:0 score=0.0 |
| | | $S_6$<br>4:0 score=0.0 | sendMail@S1<br>1:0 score=0.0 | |
| | | | sendMail@S2<br>2:0 score=0.0 | |
| | | | sendMail@S3<br>0:2 score=1.0 | |
| | | | sendMail@S4<br>1:0 score=0.0 | |
| | | | sendMail@S6<br>2:0 score=0.0 | |

FIG. 5

Network Problem Explanation

Network Resource SubNet 1 is Potentially a Bottleneck

| probe | resptime/threshold | threshold, sec. |
|---|---|---|
| probe P1_mail_Server S1 | 0.8 | 10.0 |
| probe P2_mail_Server S2 | 0.7 | 10.0 |
| probe P3_mail_Server S3 | 2.9 | 10.0 |
| probe P4_mail_Server S4 | 1.8 | 10.0 |
| probe P5_mail_Server S6 | 1.6 | 10.0 |
| probe P1_dbTest_Server S1 | 1.117 | 2.0 |
| probe P2_dbTest_Server S2 | 1.609 | 2.0 |
| probe P3_dbTest_Server S3 | 2.594 | 2.0 |
| probe P4_dbTest_Server S4 | 0.484 | 2.0 |
| probe P5_dbTest_Server S6 | 2.650 | 2.0 |
| probe P1_echo_Server S1 | 3.512 | 0.08 |
| probe P2_echo_Server S2 | 1.25 | 0.08 |
| probe P3_echo_Server S3 | 0.587 | 0.08 |
| probe P4_echo_Server S4 | 1.75 | 0.08 |
| probe P5_echo_Server S6 | 1.012 | 0.08 |

FIG. 7

SYSTEM AND METHOD FOR AUTOMATIC IDENTIFICATION OF BOTTLENECKS IN A NETWORK

BACKGROUND

1. Technical Field

The present application relates generally to a system and method for automatically diagnosing information systems that suffer from degradations in performance and service availability and, more particularly, to a system and method for automatically identifying bottleneck resources in a computer network using inference methods for analyzing end-to-end performance data without the need for detailed information about individual resources and processes.

2. Description of Related Art

A critical task in managing distributed applications is the process of diagnosing the cause of degradation in quality of service to end-users. For mission critical applications, the ability to resolve problems in an expedient manner is particularly important. Due to the complexity of distributed applications, problem diagnosis requires skills across multiple disciplines. Unfortunately, problems often get routed to the wrong department or the departments themselves do not agree on who should accept the responsibility. Therefore, it would greatly enhance productivity and reduce the time and cost of problem resolution if the scope of the problem could be automatically isolated to a small subset of bottleneck resources.

The process of identifying bottlenecks, however, is a difficult task when a large number of resources are involved. This is indeed the case even for a simple business transaction such as purchasing items over the Internet. Indeed, the application supporting the business transaction typically requires services from multiple servers. The servers may include name servers, proxy servers, web servers, mail servers, database servers, etc. In addition, the underlying application may require the service of connectivity resources to transfer data between the user machines and the servers as well as among the server machines. These connectivity resources typically include routers, switches, gateways and network bandwidths. Moreover, at the software level, the application may require services from various functional components such as file systems, directories, communication facilities, transaction middleware and databases.

Conventional approaches to problem determination include monitoring detailed metrics from individual resources. For instance, counters and meters are instrumented into various hardware and software entities to measure utilization, contention, data rates, error rates, etc. These metrics reveal the internal workings of each component. If any metric exceeds its predefined threshold value, an alarm is generated.

There are various disadvantages to using the conventional diagnostic approach. One disadvantage is that the method requires the constant monitoring of multiple metrics of potential bottleneck resources, thereby generating a large data volume and traffic and imposing an excessive workload on the information analysis system. Another disadvantage is that resource metrics may carry a large amount of redundant information, as well as apparently conflicting information. In addition, the metrics cannot reveal all possible problems.

Another disadvantage is that an excessive value of a particular resource metric at any point in time does not necessarily imply a bottleneck condition because the adverse effect of one metric is often compensated by the favorable conditions of other metrics. Indeed, in systems having built-in redundancy (e.g. alternate paths), the deficiency of one resource instance can also be absorbed by other resource instances, thereby reducing the impact on overall performance due to the temporary local anomaly. Consequently, the extensive monitoring of individual resources tends to generate large amounts of false alarms. Therefore, the aforementioned disadvantages associated with the quantitative resource metric approach may lead to scalability and accuracy problems in bottleneck identification using resource metrics from medium to large enterprises.

Another conventional technique for diagnosing problems is referred to as the "event-based" method, which involves correlating events or alarms from resources. In particular, this method involves detecting "patterns" in an event stream, where a "pattern" is generally defined as the occurrence of related events in close proximity of time. With the event-based approach, events that are part of any recognizable pattern are considered to be part of an event group. Each pattern has a leading event and the resource that originates the leading event is considered the root cause of other events in the group and the root cause of the problem associated with the pattern.

The effectiveness of the event-based approach is limited to problems arising from serious failures and malfunctioning for which explicit alarm mechanisms have been instrumented. Other disadvantages to the event-based approach is that it requires the analysis of large amounts of event or alarm data from each resource. As such, it suffers from the same scalability and accuracy problems as the resource metric based approach.

Another conventional method for identifying bottlenecks places emphasis on collecting quality of service data such as end-to-end response times and end-to-end availability measures. This data is effective for detecting problems from the end-user's perspective and provides a valid basis for suspecting that a bottleneck condition exists. The end-to-end data by itself, however, does not exactly identify the bottleneck resource. Indeed, this approach cannot be used for diagnosis in the absence of intelligent interpretations by human experts.

To overcome this problem, a more direct conventional approach involves producing a detailed breakdown of the end-to-end data into components. The component with the largest response time is deemed a bottleneck that causes problems in end-to-end response time. Unfortunately, such component level data is not always readily available from most network and server products deployed in a network configuration. Moreover, a detailed response time decomposition process requires instrumentation at each network or server resource. It often requires modifications to the application, the middleware and software modules running in the network devices.

For certain network protocols, a trace analysis approach may be used wherein response time components can be deduced from traces of low-level events by recognizing the time instants when a request or reply is sent or received by a host. Again, the analysis of protocol traces involves a great deal of reverse engineering and guess work to correlate events because the beginning and the end of each response time component is not always clearly demarcated in the trace. In addition, trace analysis poses a great challenge when the data over the network is encrypted for security reasons since the data necessary for correlation is not visible. On top of all these issues, the decomposition approach runs into scalability problems because large amounts of data have to be collected and correlated at the per resource level. As a result, the trace-based decomposition approach is used mostly for application debugging during the development stage and is not recommended for regular quality of service management after the deployment of the application.

Accordingly, a simplified system and method that provides automatic identification bottleneck resources in a computer network is highly desirable. A simplified bottleneck identification process should use only end-to-end quality of service data and eliminate the need for monitoring detailed internal resource metrics, monitoring and correlating events from resources, and measuring or estimating component response times, such as required by conventional techniques.

SUMMARY OF THE INVENTION

The present invention is directed to a system and method for providing automated bottleneck identification in networks and networked application environments by processing using end-to-end quality of service measurements in combination with knowledge of internal resource dependency information generated by a network administrator. Advantageously, the present invention utilizes end-to-end data that represents an external view of the application and makes inferences about resources that are internal to the system. The system and methods described herein do not require detailed measurements and/or estimates of parameters or data at the per resource level. Instead, a simplified heuristic approach is employed to accept or reject the hypothesis that any particular resource is a bottleneck based on evidence from various probe transactions.

In one aspect of the present invention, a method for identifying bottleneck resources in a network having a plurality of resources comprises the steps of:
 specifying a plurality of probe transactions in the network;
 generating resource dependency information representing dependent resources for each of the probe transactions;
 executing the probe transactions; measuring end-to-end quality of service data resulting from the executing of the probe transactions; and
 processing the resource dependency information and measured end-to-end quality of service data to identify bottleneck resources in the network.

In another aspect, probe transactions can be specified by allocating probe stations at desired nodes in the network and configuring the probe stations to execute various probe tests for initiating execution of service functions in remote servers in the network.

The resource dependency information for a given probe transaction may be defined by information such as (1) each important entity in a path between the probing station and the remote server,(2) the service function initiated in the remote server; (3) each function that is related to the service function initiated in the remote server,(4) additional servers that provide the related function, and (5) each important entity in a path between the remote server and the additional servers.

In another aspect, the resource dependency information of the probe transactions may be modeled by a dependency matrix D having a plurality of rows i, each row representing each resource in the network that a system administrator considers a potential bottleneck, and a plurality of columns j, each column representing a probe transaction, wherein a matrix element $D[i,j]$ is assigned a value representing the dependency of a given probe transaction j on a given resource i.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 4 is a diagram of a resource dependency model according to an embodiment of the present invention;

FIG. 5 is a diagram of a presentation format according to one aspect of the present invention for presenting output results of the bottleneck identification system;

FIG. 7 is a diagram of a presentation format according to yet another aspect of the present invention for presenting output results of the bottleneck identification system.

DETAILED DESCRIPTION OF PREFERRED EMBODIMENTS

Figure 1:
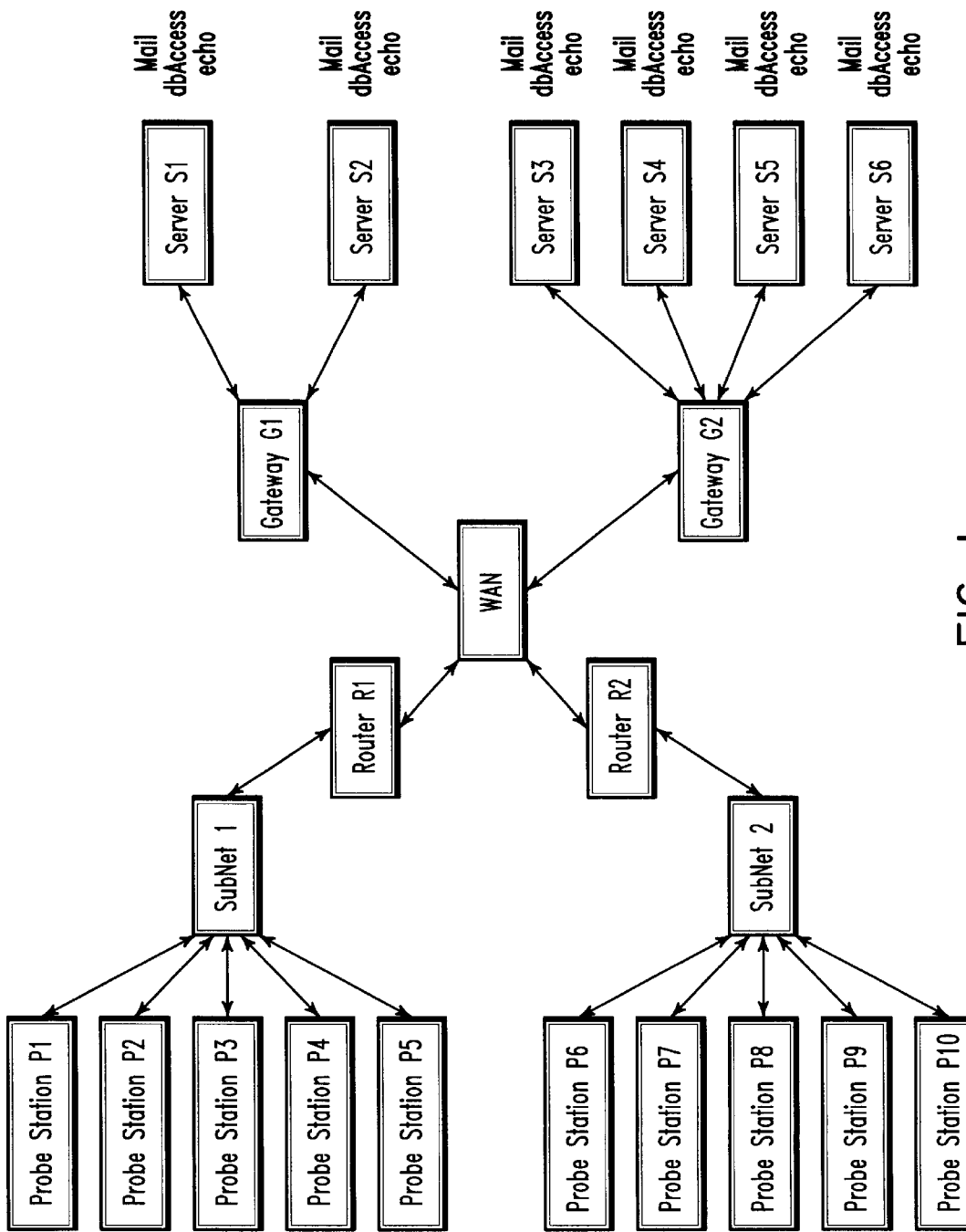
FIG. 1 is a diagram of a network topology according to an exemplary embodiment of the present invention.

Referring now to FIG. 1, a block diagram illustrates an exemplary network architecture and application environment in which the present invention may be employed. It is to be understood that although the present invention will be described herein with reference to the exemplary network embodiment of FIG. 1, those skilled in the art can readily envision other network topologies in which the present invention can be employed. The illustrative system of FIG. 1 depicts a network 10 architecture for supporting a mail application(e.g., LOTUS NOTEST™)running on a set of remote servers S1, S2, S3, S4, S5, and S6. The network 10 further comprises a set of probe stations P1 through P10 that are installed at different point in the network 10, e.g., on local area networks where user machines are connected. Each probe station P1–P10 is a client machine having a probe application for initiating a probe test with one or more remote servers S1–S6. As shown in FIG. 1, the probe stations P1–P5 are representative of users at a first site in the network 10 and probe stations P6–P10 are representative of users at a second site in the network 10. It is to be understood that the probe stations P1–P10 can either be machines that are dedicated exclusively for initiating probe tests or regular user machines having added capacity for initiating probe tests. In accordance with the present invention, the probe stations P1–P10 are strategically placed by, e.g., a system administrator such that they have different resource connectivity paths to the various servers S1–S6.

Each probe station P1–P10 comprises programs or scripts for executing one or more probe tests. In the exemplary embodiment, there are three types of probe tests, each of which representing a test against specific functionalities:
 1. "echo test"—This is a probe test whereby a TCP/IP echo is transmitted from a probe station to a remote server so as to enable the probe to determine the time duration (i.e., delay time) for connecting to the server, sending data, and receiving the same data from the server;

2. "dbAccess test"—This is a probe test which requests a remote server to access a database maintained by the server, create a document, read it and then delete it. The probe determines the time duration (i.e., time delay) for completing such transaction; and 3. "mail test"—This is a probe test which requests a server to send mail to another server. The mail origins and destinations are chosen to reveal the capabilities (and time duration) of the servers in sending and receiving mail.

The illustrative network 10 further comprises a plurality of network connectivity resources such as subnetwork servers SubNet1 and SubNet 2, Routers R1 and R2, a WAN (wide area network), and Gateways G1 and G2, all of which providing network access and connection between the user sites (e.g., probe stations P1–P10) and the remote servers S1–S6.

Figure 2:
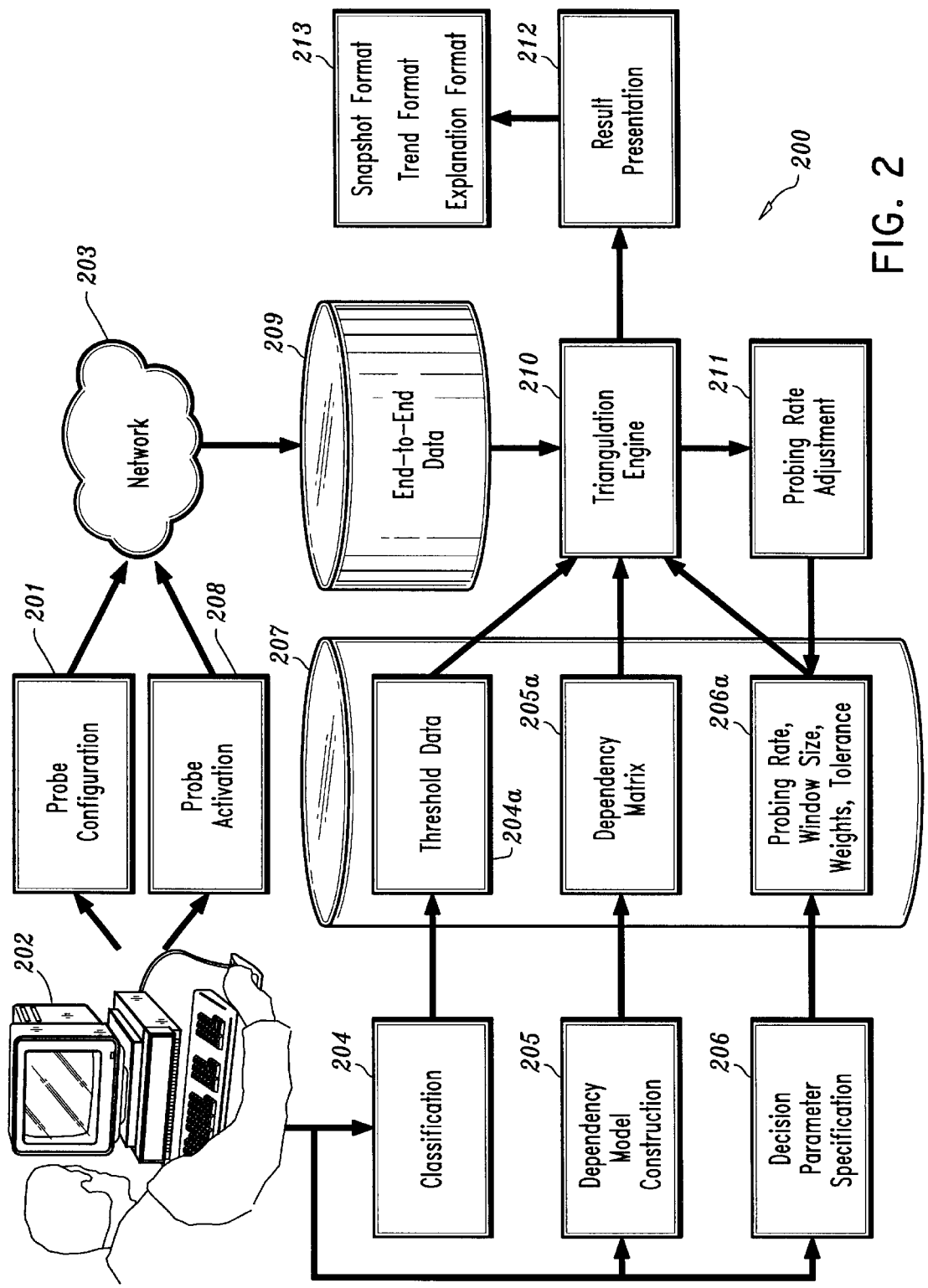
FIG. 2 is a diagram of a system/method for providing automatic identification of bottlenecks in a network according to one embodiment of the present invention.

Referring now to FIG. 2, a diagram illustrates a system according to one embodiment of the present invention for providing automatic identification of bottleneck resources in a network. FIG. 2 may also be considered a flow diagram of a method of operation of such system. It is to be understood that the bottleneck identification system and methods described herein may be implemented in various forms of hardware, software, firmware, special purpose processors, or a combination thereof. Preferably, the present invention is implemented in software as an application comprising program instructions that are tangibly embodied on a program storage device (e.g., magnetic floppy disk, RAM, CD ROM, ROM and Flash memory), and executable by any device or machine comprising suitable architecture. It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

In FIG. 2, a bottleneck identification system 200 according to an embodiment of the present invention comprises a probe configuration module 201 which allows an administrator 202 to configure and otherwise allocate probe stations at different locations in a network 203.

The probe configuration process may be performed either manually or automatically using suitable scripts and resources (or a combination thereof). The probe configuration process comprises steps such as determining the servers that support the application of interest (which are servers S1–S6 under the assumption that the network 203 (FIG. 2) is the network 10 (FIG. 1).

Another step in the probe configuration process involves strategically allocating or otherwise installing probe stations (e.g., P1–P10 in FIG. 1) at different points in the network such that they have different paths to remote servers (e.g., severs S1–S6), thereby allowing various measurements to be made.

Another step involves installing the (probe) programs or scripts on the probe stations for executing tests on various remote servers (i.e., requesting remote servers to perform typical service functions). In accordance with the illustrative embodiment herein, each probe station P1–P10 comprises a probe for performing an echo test, a dbAccess test, and a mail test.

The probe configuration process further comprises specifying one or more "probe transactions" in the network. It is to be understood that the term "probe transaction" as used herein refers to any unique combination of probe station, server and probe test (i.e., a probe station initiating a probe test with a remote server). In accordance with the illustrative embodiment herein, it is assumed that the following table includes various "probe transactions" specified by the system administrator 202 for monitoring the exemplary network of FIG. 1:

TABLE 1

| probing station | echoTest | dbTest | mailTest |
|---|---|---|---|
| P1 | S1 | S1 | S1 (mail to S2) |
| P2 | S2 | S2 | S2 (mail to S3) |
| P3 | S3 | S3 | S3 (mail to S4) |
| P4 | S4 | S5 | S4 (mail to S5) |
| P5 | S6 | S6 | S6 (mail to S1) |
| P6 | S1 | S1 | S1 (mail to S2) |
| P7 | S2 | S2 | S2 (mail to S3) |
| P8 | S3 | S3 | S3 (mail to S4) |
| P9 | S4 | S5 | S4 (mail to 55) |
| P10 | S6 | S6 | S6 (mail to S1) |

As indicated above, Table 1 comprises a plurality of probe transactions. For instance, one of the specified probe transactions (in the first row of Table 1) comprises probe station P1 executing a dbAccess test at remote Server S1. Another probe transaction (in row 1) comprises probe station P1 executing a mail test whereby server S1 sends mail to S2.

The bottleneck identification system 200 further comprises a classification module 204 which allows the administrator 202 to specify threshold data 204a representing acceptable baseline service level for each probe transaction, which is stored in a file (or metadata database) 207. Although, any suitable quality-of-service data or other availability measures (e.g, failure rates of user requests) may be utilized, in the illustrative embodiment described herein, quality-of-service data is a measure of the "end-to-end response time" of the specified probe transactions.

An "end-to-end response time" of a probe transaction refers to the total elapsed time from initiation of probe test by a probe station with a remote server to successful completion of the probe test. The system administrator 202 will associate with each probe transaction one or more threshold values that represent acceptable values for end-to-end response time. The threshold is a value above which the end-to-end response time will be classified as "abnormal" (as explained in detail below). The threshold may be either a constant number or a different number for each shift or hour of the day. The threshold value can be a number based on a service level agreement or capacity planning models. In addition, the threshold may be derived from historical data gathered over some reference period when performance is deemed to be normal by the administrator 202.

The system 200 of FIG. 2 further comprises a dependency model construction module 205 which allows the administrator 202 to generate a resource dependency model that represents various types of resource dependency information of each specified probe transaction. The information that defines the resource dependency of a given probe transaction comprises: each important entity in the path between a probing station and a server; each function initiated in a server; each related function triggered by the first initiated function; each server that provides the related function; and/or each important entity in the path between the server with the initiated function and the server that provides the related function. As explained in detail below, this resource dependency information may be modeled in a resource dependency matrix D 205a wherein the resource dependency of a given probe transaction P on a given resource R is represented by a matrix element D[R,P] having a value equal to "1". The dependency matrix D 205a is stored in database 207.

The process of building a resource dependency model (via the dependency model construction module 205) according to one aspect of the present invention comprises the following steps. Initially, the administrator 202 will enumerate the resources of interest. For instance, in accordance with the illustrative embodiment herein, the various resources considered as potential bottlenecks by the administrator 201 include the server resources (servers S1–S6), the connectivity resources (SubNet1 and SubNet2, Routers R1 and R2, the WAN, and Gateways G1 and G2), and function resources (dbAccess, sendMail, recvMail) at each server S1–S6. It is to be appreciated that the resources can be defined at any level of granularity as long as there is sufficient data to differentiate them from end-to-end response times.

The next step in building a resource dependency model is the construction of a resource dependency matrix D to represent the dependency of each probe transaction on specific resources. FIG. 4 illustrates a resource dependency matrix D according to one aspect of the present invention, wherein each row represents a specific resource, each column represents a specific probe transaction, and the value in row I and column j, D[i,j]=1 if the resource (corresponding to row I)is a dependency for the probe transaction (corresponding to column j), and D[i,j]=0 otherwise. In particular, the resource dependency matrix D of FIG. 4 depicts the resource dependencies of each probing transaction specified in Table 1 based on the network 10 of FIG. 1). For instance, the first column of the resource dependency matrix D of FIG. 4 represents the resource dependency of a probe transaction comprising a "mail test" probe initiated at probe station P1 for causing Server S1 to send mail to Server S2. More specifically, the probe transaction associated with the first column of the dependency matrix D is shown as having dependencies on the following resources: SubNet 1 where the probe station P1 is connected to the network; Router R1 for passage through, e.g., a FDDI (fiber distributed-data interface)switch network; the WAN; Gateway G1 to Server S1; Server S1 from where mail is sent; Server S2 where mail is received; sendMail@S1, the server function for sending mail at Server S1; and recvMail@S2, the server function for receiving mail at Server S2.

The dependency matrix D is constructed one column at a time based on the dependencies of each probe transaction. The administrator 202 can examine the matrix one row at a time. The number of "1"s in each row represents the amount of evidence available for diagnosing potential bottleneck in the resource associated with that row. The administrator 202 may rely on this information as the basis for changing the probing configuration to increase or decrease the amount of evidence for one or more of the individual resources such that the accuracy of bottleneck identification (as described below) can be improved. Therefore, the resource dependency matrix D provides a straightforward and powerful mechanism to visualize the effectiveness of probing schemes.

It is to be understood that the dependency matrix described above is just one embodiment for storing the dependency information and that other methods may be envisioned by those skilled in the art. For instance, rather than storing the dependency information in a rectangular array, the dependency information can be implemented as a list of lists or bit vectors as is typically done with a sparse binary matrix.

Referring again to FIG. 2, the bottleneck identification system 200 further comprises a decision parameter module 206 which allows the administrator 202 to specify decision parameters 206a which are stored in database 207 and subsequently utilized for a bottleneck identification process performed by a triangulation engine 210 (as explained in detail below). In the illustrative embodiment described herein, the following decision parameters may be specified for the bottleneck identification system 200.

1. Probing Rates: For each probe transaction, a low probing rate and a high probing rate (or probe activation frequency) are specified such that the accuracy of end-to-end response time measurements of the probe transactions can be adjusted. A probe transaction will be activated at periodic time intervals based on the probe activation frequency. For instance, the probing rate may be specified such that a certain probe transaction is initiated at a time period of every 10 minutes. Therefore, assuming a constant rate during the course of one day, the probe transaction may be initiated a maximum 144 times (i.e., 144 time periods during which the end-to-end response time of the given probe transaction is measured).

2. Evaluation Window Size: For each probe transaction, the administrator 202 can specify the size of an evaluation window based on a prespecified amount of the periodic time intervals at which the probe transactions are activated and response times measured. As explained below, the evaluation window represents the most recent interval(s) within which end-to-end response times will be used for diagnosis decisions.

3. Weighting Constants: The administrator 202 may specify a weighting constant of a given probe transaction for each dependent resource of the probe transaction. The values of the weighting constants represent the relative strengths of the probe transactions as evidence against the dependent resource as a bottleneck. In general, the fewer dependencies that a given probe transaction has, the more strength its end-to-end response time would have in isolating the dependent resources as bottlenecks. In one aspect, the default is to assign equal weights to all resources of the probe transactions. In another aspect, the selection of the weighting constants can be fine-tuned by conducting controlled experiments or with statistical analysis of a model to improve the success rate of identification. Tuning methods are beyond the scope of the present invention and are known and understood by those skilled in the art.

4. Tolerance Level: The system administrator 202 may specify a value that is compared to a resource trouble index (during a bottleneck identification process as explained below) to determine the bottleneck status of the resource. In one aspect of the present invention, the tolerance level value may range from 0 to 1.

Referring again to FIG. 2, the specified decision parameters 206a are stored in files (or meta data database) 207 and can be edited or updated by a tuning application. As explained in detail below with reference to FIG. 3, the internal user-specified information including the resource dependency information (e.g., 204a, 205a, and 206a) stored in the database 207 is processed by the triangulation engine 210 for identifying bottleneck resources. This data represents the inferences drawn by the system administrator about the network resources, which inferences are internal to the system 200. Advantageously, the present invention does not require the use of accurate estimates of any internal resource parameters at the per resource level. Instead, as will be explained below, it uses simple heuristics to accept or reject the hypothesis that any particular resource is a bottleneck based on the specified resource dependency information and evidence from the probe transactions.

The bottleneck identification system 200 further comprises a probe activation module 208 that allows the administrator to activate the probes on the probe stations P1–P10 to initiate the probe transactions in the network 203 at periodic intervals based on the specified probing rates (activation frequency) or upon demand. The end-to-end response time measurements for the activated probe transactions are measured by the probes and the measured values are then stored in a database 209 for subsequent use by the triangulation engine 210.

The triangulation engine 210 is a program that accepts as input and processes the end-to-end quality of service data (e.g. response times), classification parameters 204*a*, the resource dependency information 205*a* and/or the decision parameters 206*a* to determine whether a resource R is a bottleneck based on the amount of evidence against that resource.

In general, the triangulation engine 210 quantifies the amount of evidence against a given resource R as a trouble index I(R,t) for the resource R at time t. In accordance with the illustrative embodiment herein, the trouble index I(R,t) at time t is a function of the probe transaction response times within the evaluation window up to time t and the resource dependency matrix D. If I(R,t) for the resource R exceeds the predefined tolerance level (described above) for resource R, the resource R is identified as one of the bottleneck candidates. The triangulation engine 210 can be run at regular intervals or on demand. The input data to the triangulation engine 210 and the output results generated are stored in a database for reporting and archival purpose.

A more detailed discussion of a method of operation of the triangulation engine 210 according to one aspect of the present will now be discussed in further detail with reference to the flow diagram of FIG. 3. The method comprises an initial step of computing a moving-average response time for each probe transaction (step 300) based on the measured response times of the probe transactions (stored in database 209, FIG. 2) in the corresponding evaluation windows. In particular, assuming that:

Ns [p]=number of end-to-end response times in the current evaluation window for a probe transaction p;

RT[p,t]=end-to-end response time of probe transaction p at time period t; and

T[p,t]=moving-average response time of probe transaction p at time period t;

then the moving average for a given probe transaction p at a given time period t is computed based on the time period t and all previous time periods t based on the size of the evaluation window (i.e., prespecified number of time periods) in accordance with the following equation:

$$T[p,t]=(RT[p,t]+RT[p,t-1]+ \ldots +RT[p,t-Ns[p]+1])/Ns[p] \quad (1)$$

By way of example, assuming that the time period for probe activation is set for every 10 minutes and the evaluation window is pre-selected as having a length of 60 minutes, then the moving average response time at time t will be computed by taking the average of the end-to-end response time of the probe transaction at time period t and the end-to-end response times of the previous 5(10 minute)time periods (t−1, t−2, t−3, t−4, and t−5). In practice, the time period (or activation frequency) for activating the probe transactions may be selected such that it is greater than the maximum expected end-to-end response time.

Figure 3:
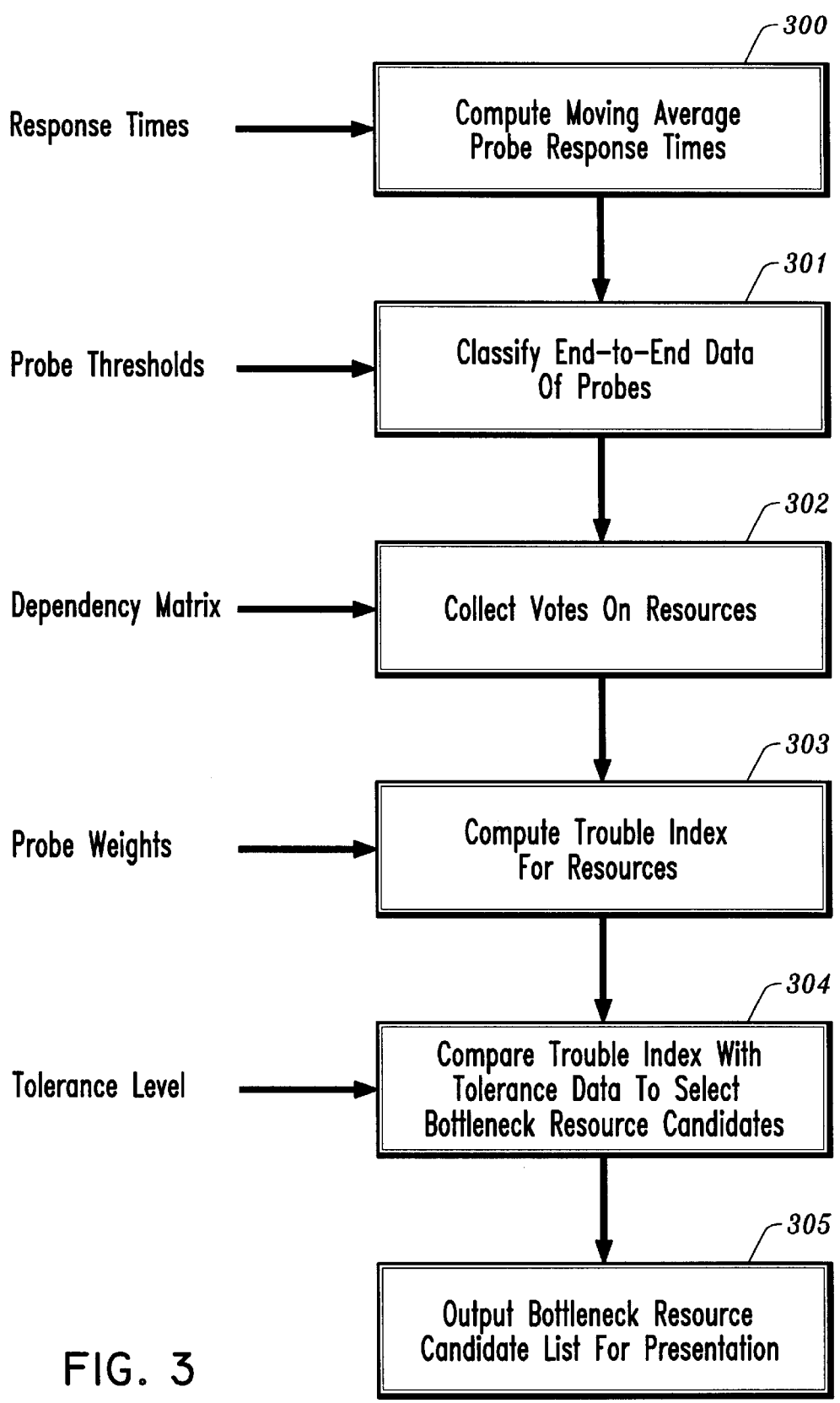
FIG. 3 is a flow diagram of a triangulation method for identifying bottleneck resources according to one aspect of the present invention.

The next step in the triangulation process of FIG. 3 is classifying end-to-end response times of the probe transactions (step 301) using the response threshold data 204*a*. In particular, assuming that:

Np=number of probe transactions; and

Nr=number of resources;

at a given time period t;

T[p,t]=moving-average response time of probe transaction p(where p=1. . . Np);

H[p,t]=threshold of probe transaction p; and

C[p,t]=response classification of probe transaction p; then

C[p,t] will be set=1 if T[p,t]>H[p,t]; and $$C[p,t] \text{ will be set=0 otherwise} \quad (2)$$

In addition, the probe transaction response will be classified as either:

"abnormal" if C[p,t]=1; or $$\text{"normal" if } C[p,t]=0 \quad (3)$$

After the each probe transaction response is classified as normal or abnormal, the next step is collecting votes on the resources (step 302) using information provided by the dependency matrix D. In general, if the response of a given probe transaction is classified as abnormal, each dependent resource is accorded a negative vote. On the other hand, if a response of a given probe transaction is classified as normal, each dependent resource is accorded a positive vote. More specifically, assuming that for each time period t:

Vpos[p,R,t]=positive vote for resource R of probe transaction p;

Vneg[p,R,t]=negative vote for resource R of probe transaction p; then

Vpos[p,R,t]=1 if C[p,t]=0 and D[R,p]=1;

Vpos[p,R,t]=0 otherwise;

Vneg[p,R,t]=1 if C[p,t]=1 and D[R,p]=1; and $$Vneg[p,R,t]=0 \text{ otherwise} \quad (4)$$

The next step is computing a trouble index for the resources (step 303) using previously specified probe weights (206*a*) as input. In particular assuming that:

w[p,R]=weighting constant of probe transaction p for resource R;

then for each time period t, the total positive and negative votes are computed as follows:

$$\text{TotalVpos}[R,t]=w[1,R]^*\text{Vpos}[1,R,t]+w[2,R]^*\text{Vpos}[2,R,t]+ \ldots +w[Np,R]^*\text{Vpos}[Np,R,t]; \quad (5)$$

and $$\text{TotalVneg}[R,t]=w[1,R]^*\text{Vneg}[1,R,t]+w[2,R]^*\text{Vneg}[2,R,t]+ \ldots +w[Np,R]^*\text{Vneg}[Np,R,t] \quad (6)$$

In addition, assuming that:

$$TI[R,t]=\text{trouble index of resource R, then } TI[R,t]=\text{TotalVneg}[R,t]/(\text{TotalVneg}[R,t]+\text{TotalVpos}[R,t]) \quad (7)$$

As illustrated above, the negative votes provide evidence to implicate a resource as a potential bottleneck whereas the positive votes provide evidence to exonerate the resource as a potential bottleneck suspect.

After the trouble index is computed for each resource, the next step is comparing the trouble index with the previously specified tolerance levels (step 304) to select the bottleneck resources. In particular, for each time period t, those resources R having TI[R,t]>L (where L is the predefined level of tolerance) are identified as bottlenecks. A candidate list of identified bottleneck resources are then output for presentation (step 305).

Referring again to FIG. 2, the results of the triangulation process of FIG. 3 will be processed by the result presentation module 212 which then displays the output results in one of various visual presentation formats 213. Various presentation formats that are implemented in accordance with the present invention include a snapshot format, a trend format and an explanation format. For instance, FIG. 5, illustrates a snapshot format in accordance with one aspect of the present invention. The snapshot format displays all the bottleneck resources during any particular time period grouped according to resource type. For instance, the SubNet resources, path (connectivity) resources, server resources, and function (transaction) resources are shown grouped together in their respective columns. Each displayed resource includes a resource field (which identifies the resource) and a score field. Each score field comprises a group of numbers that are associated with each displayed resource. This group of numbers has the following format:

$$\text{TotalVpos}[R,t]\text{:TotalVneg}[R,t]\text{score}=TI[R,t].$$

As discussed above, the value for TotalVpos[R,t] is determined using equation (5), TotalVneg[R,t] is determined using equation (6) and TI[R,t] is determined using equation (7). By way of example, user subnet SubNet 2 for a given time t is represented in the display of FIG. 5 as having a total number of positive votes=12 and a total number of negative votes=3, thereby resulting in a score (trouble index) of 3/(12+3)=0.2 (assuming the weights are set equal to 1, for example). The score fields can be color-coded based on the value of the score (or severity of bottleneck) to assist the administrator in readily identifying potential bottleneck resources. For instance, for resources having scores <⅓, the score field can be colorless. For resources having scores ≧⅓ but <⅔, the score field can be yellow such as indicated in FIG. 5 (Server resources S3 and S4) by light shading. In addition, for resources having scores ≧⅔, the score field can be red, such as indicated in FIG. 5 (function resources sendMail@S3 and recvMail@S4) by heavy shading. The snapshot format assists the administrator to observe the extent of bottlenecks and discover interrelationships.

Figure 6:
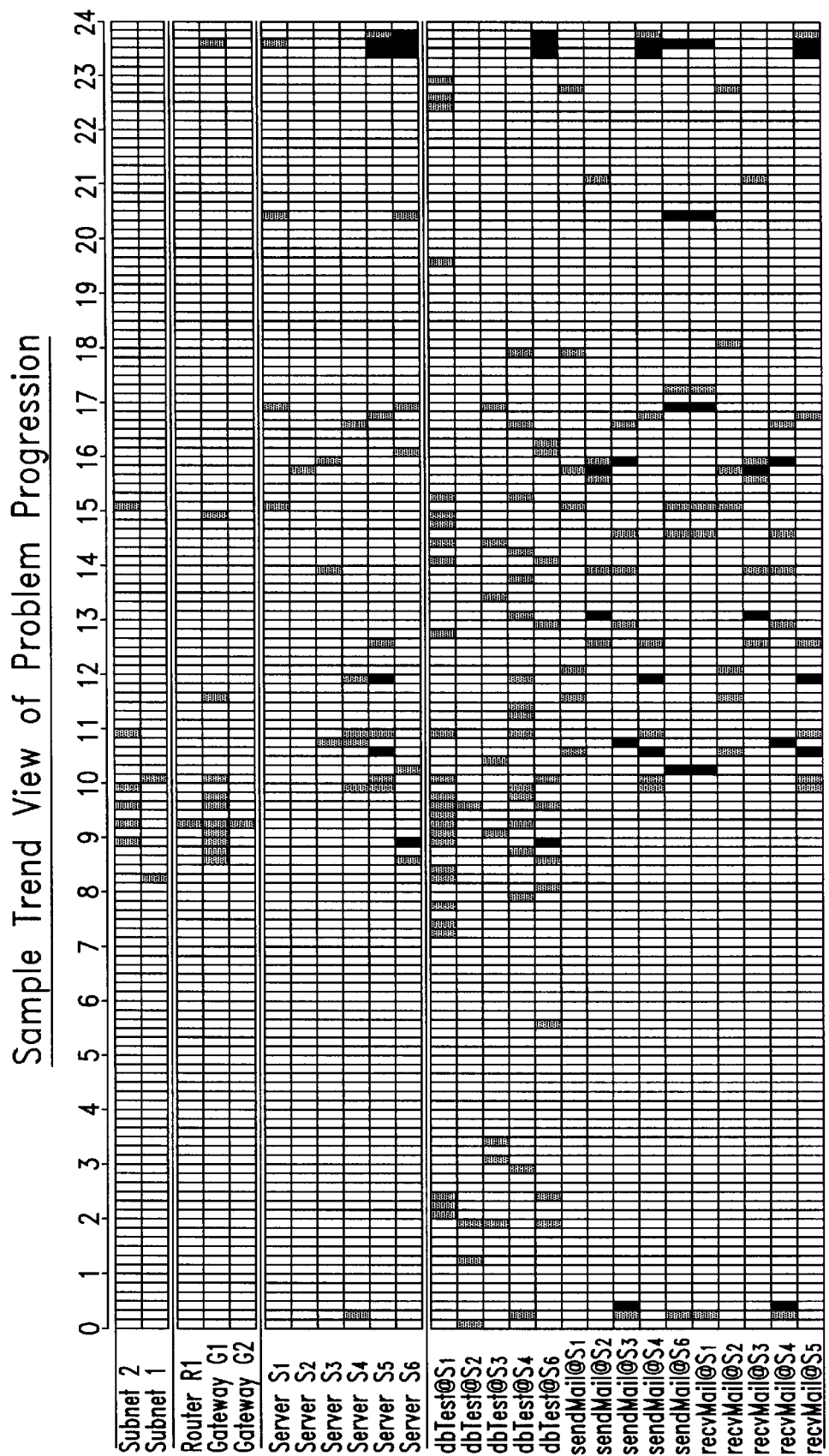
FIG. 6 is a diagram of a presentation format according to another aspect of the present invention for presenting output results of the bottleneck identification system.

Referring to FIG. 6, a diagram illustrates a trend presentation format in accordance with one aspect of the present invention. In FIG. 6, the bottleneck status of each resource (on the left-hand side)is displayed as a function of time. The time is illustrated for a period of 24 hours. Each hour comprises 6 time period blocks (each 10 minutes in duration). Each time period block may be color-coded based on the computed score (trouble index) for that time period. It is to be understood that each column in FIG. 6 represents a snapshot view (FIG. 5) of the resources for a given time period. Therefore, the color-coding scheme depicted in FIG. 6 is similar to the scheme discussed above for FIG. 5. The trend display format assists the administrator to recognize the trend and persistence of problem progression.

Referring now to FIG. 7, a diagram illustrates an explanation presentation format in accordance with one aspect of the present invention. With this format, the results of the triangulation engine are explained by allowing the administrator to "drill-down" from any bottleneck resource to (1) the probe transaction measurements that have dependencies on the resource and (2) the thresholds used for classification, for any given time period t. For example, the first column (labeled "probe") displays the various probe transactions with the potential bottleneck resource SubNet 1 as a dependent resource. The second column(labeled "resptime/threshold") represents the ratio of the moving-average response time (for the given time period t) to the pre-specified response threshold value (the pre-specified response threshold value being displayed in the third column). For abnormal response times (where the ratio value in column 2 is >1), the probe transaction can be color coded (red) (as demonstrate by the shading in FIG. 7). Accordingly, the administrator can readily understand the sources of evidence against the resource.

Referring again to FIG. 2, a probing rate adjustment module 211 allows the administrator 202 to adapt the probing frequency based on the bottleneck identification results. In particular, after having identified a set of bottleneck candidates as resources of concern, the probing rate can be modified to increase the accuracy of triangulation as follows. For all probe transactions p where D[R,p]=1 and R is in the candidate list, the probing rate can be set to the high value. On the other hand, for all other probe transactions, the probing rate can be set to the low value.

As illustrated above, the present invention provides a system and method for identifying bottleneck resources using high-level data such as end-to-end response times. Thus, it establishes an explicit link between the results of diagnosis and the experience of the users of the application. This makes it easier to explain and understand the rationale.

Advantageously, the system and methods described herein in accordance with the present invention do not require detailed data at the per resource level. Therefore, it is much cheaper to implement and less data-intensive than conventional bottleneck identification techniques. Indeed, the present invention overcomes the scalability problems associated with the conventional diagnostic methods such as the resource-based method. In addition, the present invention does not preclude the use of detailed resource metrics. Rather, it serves as a first-level analysis that automatically reduces the scope of investigation. Indeed, after the initial analysis, the administrator can focus solely on the relevant resources, if necessary, for a more detailed analysis.

Another advantage associated with the present invention is that it utilizes expert knowledge about the network configuration, which can be readily solicited from the administrator or the personnel responsible for setting up the probe transactions. In addition, there are tools currently available that can assist the analyst to do automatic discovery of dependencies, e.g. tools for discovering network topology. The implementation and placement of the probe transactions reflect an individual's implicit understanding about the application environment regarding connectivity, dependencies and notions of problem severity. Conventionally, this tacit knowledge is often used by the analyst in an ad hoc fashion. Indeed, the conventional methods of digesting, merging and intersecting large amounts of probe transaction data over multiple time periods is overwhelming to the administrator. Rather than relying on the administrator to mentally map this massive data against the configuration, the present invention advantageously provides an explicit and formal mechanism for capturing such knowledge and uses it systematically and automatically for diagnosis. As explained above, this mechanism includes a resource dependency matrix, probe transaction thresholds, evaluation window size, probe transaction weighting constants and tolerance levels. These concepts are readily understandable and do not require expert skills in representation languages, decision graphs or statistical procedures.

The triangulation process described herein utilizes model-based reasoning and avoids the huge knowledge acquisition effort usually required in rule-based systems where the user has to create, test and maintain the rules.

Another advantage of the present invention is that the triangulation process described herein is data-driven. Indeed, both the dependency matrix and the decision parameters are externalized so that they may be updated without affecting the logic of triangulation process. This allows the user (or an automated program wherever feasible) to easily modify the model when the network configuration is changed and fine tune the decision parameters for improving accuracy, without having to modify the triangulation code.

In addition, the present invention utilizes end-to-end data that represents an external view of the application and makes inferences about resources that are internal to the system. It does not attempt to provide accurate estimates of any internal resource parameters. Instead, it uses simple heuristics to accept or reject the hypothesis that any particular resource is a bottleneck based on evidence from the probe transactions. Therefore, it is fundamentally different from diagnosis approaches that use regression models or other statistical techniques of parameter estimation (e.g. maximum likelihood estimation).

Furthermore, the present invention utilizes pre-planned active probing from different vantage points to create information for differentiating various implications of bottleneck conditions. The quality of the data is controllable by probe transaction design and placement. Therefore, it is fundamentally different from conventional passive diagnosis approaches that rely on unsolicited events and alarms.

The present invention differs from a navigation-based approach which generally assumes a scheme for partitioning measurement data (e.g. as a multidimensional database) and then identifies the partition that exhibits the most significant deviation from nominal behavior. The navigation approach does not take advantage of dependency information. The present invention also differs from a discovery-based approach which extracts generic patterns in event streams that are associated with specific causes and effects and then matches current events against those patterns. The origin of the leading event in any matched pattern is considered the cause of problems. In contrast, the triangulation process does not use any explicit representation of patterns in data, nor does it use any detailed event data from resources.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for identifying bottleneck resources in a network having a plurality of resources, comprising the steps of:

specifying a plurality of probe transactions in the network;

generating resource dependency information representing dependent resources for each of the probe transactions;

executing the probe transactions;

measuring end-to-end quality of service data resulting from the executing of the probe transactions; and processing the resource dependency information and measured end-to-end quality of service data to identify bottleneck resources in the network.

2. The method of claim 1, wherein the step of specifying the probe transactions comprises the steps of:

allocating a probe station at desired nodes in the network; and configuring the allocated probe station at each node to execute at least one probe test for initiating execution of a service function in a remote server in the network.

3. The method of claim 2, wherein the resource dependency information for each of the probe transactions comprises one of (1) each important entity in a path between the probing station and the remote server, (2) the service function initiated in the remote server, (3) each function that is related to the service function initiated in the remote server, (4) any additional server that provides the related function, (5) each important entity in a path between the remote server and the any additional server, and a combination thereof.

4. The method of claim 1, wherein the step of generating resource dependency information for the probe transactions, comprises the steps of:

selecting resources in the network that are considered as potential bottlenecks; and building a resource dependency model representing the dependency of each of the probe transactions on the selected resources.

5. The method of claim 4, wherein the resource dependency model comprises a dependency matrix D having a plurality of rows i, each row representing one of the selected resources, and a plurality of columns j, each column representing one of the probe transactions, wherein a matrix element $D[i,j]$ is assigned a value representing the dependency of a given probe transaction j on a given resource i.

6. The method of claim 1, wherein the step of executing the probe transactions comprises the steps of:

specifying at least one probing rate for each of the probe transaction; and performing the probe transactions at periodic time intervals based on the at least one probing rate.

7. The method of claim 6, further comprising the step of increasing the at least one probing rate for any probe transaction that has dependent resources identified as bottleneck resources.

8. The method of claim 1, wherein the step of processing comprises the steps of:

classifying the measured end-to-end quality of service data of each probe transaction as one of normal and abnormal;

collecting votes on the dependent resources from each of the probe transactions based on the classification of the measured end-to-end quality of service data;

computing a trouble index for each resource using the collected votes from the probe transactions; and considering the trouble index to determine if a dependent resource of the probe transactions is a bottleneck.

9. The method of claim 8, wherein the step of classifying the measured end-to-end quality of service data of each probe transaction comprises the steps of:

selecting at least one threshold value representing an acceptable baseline service level of the end-to-end quality of service data for the probe transactions;

comparing the measured end-to-end quality of service data with the at least one threshold value; and classifying the measured end-to-end quality of service data as abnormal if its value exceeds the at least one threshold value and normal otherwise.

10. The method of claim 9, further comprising the steps of:

specifying at least one probing rate for each of the probe transactions;

performing each of the probe transactions at periodic time intervals based on the at least one probing rate;

specifying a current evaluation window as comprising a predefined number of periodic time intervals prior to any given time t; and computing a moving-average of the measured end-to-end quality of service data at a given time t using measured end to end quality of service data in the evaluation window, wherein the computed moving-average is used in the comparing step.

11. The method of claim 8, wherein the step of collecting votes on the dependent resources comprises the steps of:

according a positive vote to each dependent resource of each probe transaction if the corresponding measured end-to-end quality of service data is classified as normal; and according a negative vote to each dependent resource of each probe transaction if the corresponding measured end-to-end quality of service data is classified as normal.

12. The method of claim 11, wherein the step of computing a trouble index for-each of the dependent resources of each probe transaction using the collected votes comprises the steps of;

specifying a weighting constant for each dependent resource of each probe transaction representing a relative strength of the probe transaction as evidence of the dependent resource as a bottleneck;

computing a total positive evidence value for each dependent resource as a weighted sum of all the positive votes of the dependent resource using the corresponding specified weighting constant; and computing a total negative evidence value for each dependent resource as a weighted sum of all the negative votes of the dependent resource using the corresponding specified weighting constant;

wherein the trouble index for a dependent resource is computed as the total negative evidence value divided by the sum of the total positive evidence value and total negative evidence value.

13. The method of claim 8, wherein the step of considering the trouble index to determine if a resource is a bottleneck comprises the steps of:

specifying at least one tolerance level representing a total strength of evidence to identify a resource as a bottleneck candidate;

comparing the at least one tolerance level with the computed trouble index of each dependent resource; and identifying as a bottleneck candidate, each dependent resource having a trouble index that exceeds the at least one tolerance level.

14. A program storage device readable by a machine, tangibly embodying a program of instructions executable by the machine to perform method steps for identifying bottleneck resources in a network having a plurality of resources, the method steps comprising:

generating resource dependency information representing dependent resources for each one of a plurality of specified probe transactions in a network;

executing the probe transactions;

measuring end-to-end quality of service data resulting from the executing of the probe transactions; and processing the resource dependency information and measured end-to-end quality of service data to identify bottleneck resources in the network.

15. The program storage device of claim 14, wherein the instructions for performing the step of generating resource dependency information for the probe transactions comprise instructions for performing the steps of:

selecting resources in the network that are considered as potential bottlenecks; and building a resource dependency model representing the dependency of each of the probe transactions on the selected resources.

16. The program storage device of claim 15, wherein the resource dependency model comprises a dependency matrix D having a plurality of rows i, each row representing one of the selected resources, and a plurality of columns j, each column representing one of the probe transactions, wherein a matrix element D[i,j] is assigned a value representing the dependency of a given probe transaction j on a given resource i.

17. The program storage device of claim 14, wherein the instructions for performing the step of processing comprise instructions for performing the steps of:

classifying the measured end-to-end quality of service data of each probe transaction as one of normal and abnormal;

collecting votes on the dependent resources from each of the probe transactions based on the classification of the measured end-to-end quality of service data;

computing a trouble index for each resource using the collected votes from the probe transactions; and considering the trouble index to determine if a dependent resource of the probe transactions is a bottleneck.

18. The program storage device of claim 17, wherein the instructions for performing the step of classifying the measured end-to-end quality of service data of each probe transaction comprise instructions for performing the steps of:

comparing the measured end-to-end quality of service data with at least one threshold value representing an acceptable baseline service level of the end-to-end quality of service data for the probe transactions; and classifying the measured end-to-end quality of service data as abnormal if its value exceeds the at least one threshold value and normal otherwise.

19. The program storage device of claim 17, further comprising instructions for performing the steps of:

specifying at least one probing rate for each of the probe transactions;

performing each of the probe transactions at periodic time intervals based on the at least one probing rate;

specifying a current evaluation window as comprising a predefined number of periodic time intervals prior to any given time t; and computing a moving-average of the measured end-to-end quality of service data at a given time t using measured end to end quality of service data in the evaluation window, wherein the computed moving-average is used in the comparing step.

20. The program storage device of claim 17, wherein the instructions for performing the step of collecting votes on the dependent resources comprise instructions for performing the steps of:

according a positive vote to each dependent resource of each probe transaction if the corresponding measured end-to-end quality of service data is classified as normal; and according a negative vote to each dependent resource of each probe transaction if the corresponding measured end-to-end quality of service data is classified as normal.

21. The program storage device of claim 20, wherein the instructions for performing the step of computing a trouble index for each of the dependent resources of each probe transaction using the collected votes comprise instructions for performing the steps of:

specifying a weighting constant for each dependent resource of each probe transaction representing a relative strength of the probe transaction as evidence of the dependent resource as a bottleneck;

computing a total positive evidence value for each dependent resource as a weighted sum of all the positive votes of the dependent resource using the corresponding specified weighting constant; and computing a total negative evidence value for each dependent resource as a weighted sum of all the negative votes of the dependent resource using the corresponding specified weighting constant;

wherein the trouble index for a dependent resource is computed as the total negative evidence value divided by the sum of the total positive evidence value and total negative evidence value.

22. The program storage device of claim 17, wherein the instructions for performing the step of considering the trouble index to determine if a resource is a bottleneck comprise instructions for performing the steps of:

specifying at least one tolerance level representing a total strength of evidence to identify a resource as a bottleneck candidate;

comparing the at least one tolerance level with the computed trouble index of each dependent resource; and identifying as a bottleneck candidate, each dependent resource having a trouble index that exceeds the at least one tolerance level.

23. The program storage device of claim 14, further comprising instructions for generating a report of the identified bottleneck resources by one of displaying a snapshot of a bottleneck status of each resource in the network at a given time grouped by the type of resource, displaying a trend view of a bottleneck status of each resource in the network over adjacent time periods, and listing average of the measured end-to-end quality of service data for each identified bottleneck resource and a rationale for identifying the resource as a bottleneck.

24. A system for identifying bottleneck resources in a network having a plurality of resources, comprising:

a first database for storing measured end-to-end quality of service data resulting from the execution of a plurality of probe transactions in the network;

a resource dependency model generator for specifying resources in the network that are considered potential bottleneck resources and generating a resource dependency model to represent resource dependency information for each of the probe transactions based on the specified resources;

a second database for storing the resource dependency model; and a triangulation engine for processing the resource dependency information and measured end-to-end quality of service data for the plurality of probe transactions to identify bottleneck resources in the network.

25. The system of claim 24, wherein each probe transaction comprises a probe station in the network executing at least one probe test to initiate a service function at a remote server in the network, and wherein the resource dependency information for each probe transaction comprises one of (1) each important entity in a path between the corresponding probing station and the remote server, (2) the service function initiated in the remote server, (3) each function that is related to the service function initiated in the remote server, (4) any additional server that provides the related function, (5) each important entity in a path between the remote server and the any additional server, and a combination thereof.

26. The system of claim 25, wherein the resource dependency model comprises a dependency matrix D having a plurality of rows i, each row representing one of the specified potential bottleneck resources, and a plurality of columns j, each column representing one of the probe transactions, wherein a matrix element D[i,j] is assigned a value representing the dependency of a given probe transaction j on a given resource i.

27. The system of claim 24, further comprising:

a classification module for defining at least one threshold value representing an acceptable baseline service level of the end-to-end quality of service data for the probe transactions; and a decision parameter specification module for specifying decision parameters comprising one of (1) at least one probing rate for each of the probe transactions for performing the probe transactions at periodic time intervals based on the at least one probing rate; (2) a current evaluation window comprising a predefined number of periodic time intervals prior to any given evaluation time t; (3) a weighting constant for each dependent resource of each probe transaction representing a relative strength of the probe transaction as evidence of the dependent resource as a bottleneck; (4) at least one tolerance level representing a total strength of evidence to identify a resource as a bottleneck candidate; and a combination thereof, wherein the at least one threshold value and the decision parameters are stored in the second database.

28. The system of claim 27, wherein the triangulation engine comprises:

means for classifying the measured end-to-end quality of service data of each probe transaction stored in the first database as one of normal and abnormal;

means for collecting votes on the dependent resources from each of the probe transactions based on the classification of the measured end-to-end quality of service data;

means for computing a trouble index for each resource using the collected votes from the probe transactions; and means for considering the trouble index to determine if a dependent resource of the probe transactions is a bottleneck.

29. The system of claim 28, wherein triangulation engine further comprises means for computing a moving-average of the measured end-to-end quality of service data stored in the first database at a given time t using measured end-to-end quality of service data in the specified evaluation window, and wherein the means for classifying the measured end-to-end quality of service data of each probe transaction comprises means for comparing the measured end-to-end quality of service data with the at least one threshold value specified for the end-to-end quality of service data for the probe transactions, wherein the measured end-to-end quality of service data is classified as abnormal if its value exceeds the at least one threshold value and classified as normal otherwise.

30. The system of claim 28, wherein the means for collecting votes on the dependent resources comprises means for according a positive vote to each dependent resource of each probe transaction if the corresponding measured end-to-end quality of service data is classified as normal, and for according a negative vote to each dependent resource of each probe transaction if the corresponding measured end-to-end quality of service data is classified as normal.

31. The system of claim 28, wherein the means for computing a trouble index for each of the dependent resources of each probe transaction using the collected votes comprises means for computing a total positive evidence value for each dependent resource as a weighted sum of all the positive votes of the dependent resource using the corresponding specified weighting constant, and for computing a total negative evidence value for each dependent resource as a weighted sum of all the negative votes of the dependent resource using the corresponding specified weighting constant;

wherein the trouble index for a dependent resource is computed as the total negative evidence value divided by the sum of the total positive evidence value and total negative evidence value.

32. The system of claim 28, wherein the means for considering the trouble index to determine if a resource is a bottleneck comprises:

means for comparing the at least one specified tolerance level with the computed trouble index of each dependent resource; and means for identifying as a bottleneck candidate, each dependent resource having a trouble index that exceeds the at least one tolerance level.

* * * * *